United States Patent
Koontz et al.

(10) Patent No.: US 7,334,261 B2
(45) Date of Patent: Feb. 19, 2008

(54) MACHINE POST-LAUNCH CONFIGURATION AND OPTION UPGRADE WITH MASTER KEY

(75) Inventors: Robert A. Koontz, Webster, NY (US); James A. Long, Fairport, NY (US); Heiko Rommelmann, Penfield, NY (US)

(73) Assignee: Xerox Corporation, Norwalk, CT (US)

( * ) Notice: Subject to any disclaimer, the term of this patent is extended or adjusted under 35 U.S.C. 154(b) by 810 days.

(21) Appl. No.: 10/630,076

(22) Filed: Jul. 30, 2003

(65) Prior Publication Data

US 2005/0036794 A1 Feb. 17, 2005

(51) Int. Cl.
*G06F 9/00* (2006.01)

(52) U.S. Cl. .......................... 726/17; 726/18; 726/19; 726/20; 726/9; 705/5; 705/55

(58) Field of Classification Search .................. 726/17, 726/18, 19, 20, 9; 705/5, 55
See application file for complete search history.

(56) References Cited

U.S. PATENT DOCUMENTS

| | | | |
|---|---|---|---|
| 4,496,237 A | 1/1985 | Schron | 355/14 C |
| 4,961,088 A | 10/1990 | Gilliland et al. | 355/206 |
| 5,103,081 A * | 4/1992 | Fisher et al. | 235/462.03 |
| 5,649,185 A * | 7/1997 | Antognini et al. | 707/9 |
| 5,928,363 A * | 7/1999 | Ruvolo | 726/22 |
| 6,212,635 B1 * | 4/2001 | Reardon | 713/165 |
| 6,236,981 B1 * | 5/2001 | Hill | 705/67 |
| 6,351,621 B1 * | 2/2002 | Richards et al. | 399/111 |
| 6,563,600 B1 | 5/2003 | Young | 358/1.5 |
| 6,795,703 B2 * | 9/2004 | Takae et al. | 455/418 |
| 2001/0034713 A1 | 10/2001 | Nakai et al. | |

FOREIGN PATENT DOCUMENTS

EP 0 743 602 A1 11/1996

OTHER PUBLICATIONS

"Privilege User's Guide", Version 2.0, Privilege Secure Software Distribution User's Guide, XP002209452, Jun. 2001.

* cited by examiner

*Primary Examiner*—Thomas R. Peeso
(74) *Attorney, Agent, or Firm*—Christopher D. Wait

(57) ABSTRACT

By providing a secure EEPROM (Electrically Erasable Programmable Read Only Memory) device or other non-volatile memory (NVM) in an arrangement of a master key system operation key (SOK) plus any subsequently installed SOK to control the configurable machine option attributes, various problems associated with machine option configuration and updates may be accommodated. At the initial install of either SOK type the identity of the machine is written to the NVM, i.e. the machine serial number. This is performed during the initial machine power up or reboot sequence. If the SOK type is a subsequently installed SOK, the option code(s) from the subsequently installed SOK are written to the master key SOK. As part of the power on or reboot routine the machine will check to ensure no tampering has taken place and that the machine identity and the NVM serial number location data match. A new swapped in SOK can be installed so long as the NVM serial number location has not been previously written to with a conflicting identification number. The machine will then write the serial number to the new SOK thereby protecting it.

18 Claims, 3 Drawing Sheets

MACHINE POST-LAUNCH CONFIGURATION AND OPTION UPGRADE WITH MASTER KEY

RELATED CASES

Cross reference is made to the following related applications incorporated by reference herein: entitled "MACHINE POST-LAUNCH CONFIGURATION AND OPTION UPGRADE" to Robert A. Koontz, Christian Redder, Heiko Rommelmann, David S. Shuman, and Christian G. Midgley; and entitled "WIRELESS MACHINE POST-LAUNCH CONFIGURATION AND OPTION UPGRADE" to Heiko Rommelmann, Robert A. Koontz, and Christian Redder.

BACKGROUND

The present invention relates generally to the updating of machine options. The invention relates more importantly to the upgrade of printer and copier machine option features and capabilities. The invention relates in particular with regards to a machine controller, controller support memory units, and enabling keys.

In the office-equipment market, such as for printers and copiers, a common business model is to manufacture a single base "platform" in hardware, and then use the software controls over the hardware to provide a set of distinctly different products. In an office multi-function product this may include both software controlled operational upgrades as well as software controlled hardware upgrades. For instance, with reference to digital xerographic "laser printers," a basic hardware platform capable of outputting 40 pages per minute (ppm) can be slowed down to output pages at 30 ppm or even 20 ppm, purely by altering the control software which operates the identical hardware. Typical techniques for slowing down a basic hardware platform include simply running the various electric motors at slower speeds, or deliberately skipping an operational cycle (not feeding a print sheet, and withholding image data) for one or more of a given number of hardware cycles. The advantages of this business model include the desirability of selling different speed-rated machines at different prices to meet market demands, and also the ability to speed up a sloweddown machine (such as by loading in new software) should an existing customer decide he wants a faster machine. Also, in a re-manufacturing environment, it is useful to be able to minimize the number of hardware configurations that must be processed.

Machines sold, installed, and serviced will typically require either customer interaction or service representative intervention to enable some or all of the possible software and hardware features. This may be carried out either by a service representative at the time of install or on a subsequent service call. In the latter case, it usually requires some sort of password and enablement key. This is typically obtained by the service representative and is then entered into the machine via a GUI or some service tool. Alternatively, customers are required to interact with the manufacturer either over the phone or through the web to get the desired options enabled. As a consequence for either of the above scenarios, there is a burden on the manufacturer's support infrastructure to obtain needed information from the customer and ensure that the customer receives all they are entitled to. Further, the system may also be vulnerable to failure if the machine requires a replacement or upgrade of software and the settings are not carefully kept track of. All of these requirements are complex and add a significant cost to doing business. A further technical challenge in providing office equipment centered upon a single basic hardware platform that may be configured with multiple options, is to provide some security that the option set of a particular machine (such as at a customer site) will not be altered, such as being sped up, in an unauthorized or improper manner.

In U.S. Pat. No. 6,563,600 to Young, the invention described discloses a basic hardware platform of a copier or printer that is selectably enabled to operate at different speeds, such as 40 ppm or 30 ppm, by a combination of entering a password into non-volatile memory within the machine, and also altering a state of a hardware switch within the machine.

In U.S. Pat. No. 4,496,237 to Schron, the invention described discloses a reproduction machine having a non-volatile memory for storing indications of machine consumable usage such as photoreceptor, exposure lamp and developer, and an alphanumeric display for displaying indications of such usage. In operation, a menu of categories of machine components is first scrolled on the alphanumeric display. Scrolling is provided by repetitive actuation of a scrolling switch. Having selected a desired category of components to be monitored by appropriate keyboard entry, the sub-components of the selected category can be scrolled on the display. In this manner, the status of various consumables can be monitored and appropriate instructions displayed for replacement. In another feature, the same information on the alphanumeric display can be remotely transmitted.

In U.S. Pat. No. 4,961,088 to Gilliland et al., there is disclosed a monitor/warranty system for electrostatographic reproducing machines in which replaceable cartridges providing a predetermined number of images are used, each cartridge having an EEPROM programmed with a cartridge identification number that when matched with a cartridge identification number in the machine enables machine operation, a cartridge replacement warning count, and a termination count at which the cartridge is disabled from further use, the EEPROM storing updated counts of the remaining number of images left on the cartridge after each print run.

U.S. Pat. No. 6,351,621 to Richards et al., discloses that in a printer or copier, a removable module, such as a marking material supply module or a marking device module, is provided with a non-volatile memory chip which retains information about the cumulative use of the module and other performance-related data. The non-volatile memory is accessed through a wireless interface, such as an RF loop or IR detector, which is also associated with the module. The memory can be accessed, through wireless means, either by the printer or copier itself or by an external device. The wireless interface can also be used to access a memory which is attached to part which moves within the printer or copier, such as a roller or drum, thus avoiding the use of wire harnesses.

All of the patents indicated above are herein incorporated by reference in their entirety for their teaching.

Therefore, as discussed above, there exists a need for an arrangement and methodology which will solve the problem of providing system option updates and reconfiguration without the need for a field service call. Thus, it would be desirable to solve this and other deficiencies and disadvantages as discussed above with an improved methodology for updating machine options.

The present invention relates to a method for managing machine operation options and configuration. The method comprises providing a master key software operation key separable from the machine, and a subsequently installed software operation key separable from the machine, the subsequently installed software operation key further comprising a memory, with a programmable serial region and an option code. The method further comprises placing the subsequently installed software operation key into the machine, reading the programmable serial region of the memory and if found blank, initializing with a machine identification number, comparing the content of the programmable serial region if not blank with the machine identification number and reading the memory and installing the option code into the master key software operation key. The method finally comprises operating the machine in accordance with the option code in the master key software operation key.

The present invention relates to a printing machine comprising a master key software operations key separable from the machine and a subsequently installed software operations key separable from the machine. The subsequently installed software operations key having a memory, with the memory having at least an option code region, and a one time programmable serial region. The printing machine also comprises an option code written into the option code region of the memory suitable for directing the printing machine to operate in a particular configuration, and a control system to access the one time programmable serial region of the memory and determine thereby if the option code in the option code region of the subsequently installed software operations key should be installed into the master key software operations key to configure the printing machine.

In particular, the present invention relates to a method for managing machine operation options and configuration. The method comprises providing a master key software operation key separable from the machine, the master key software operation key further comprised of a first memory, with a first programmable serial region and a first option code. Also provided is a subsequently installed software operation key separable from the machine, the subsequently installed software operation key further comprised of a second memory, with a second programmable serial region and a second option code. The master key software operation key is placed into the machine, and the first programmable serial region of the first memory is read and if found blank, initialized with a machine identification number. The content of the first programmable serial region if not blank is compared with the machine identification number. The method further comprises placing the subsequently installed software operation key into the machine, reading the second programmable serial region of the second memory and if found blank, initializing with the machine identification number. The content of the second programmable serial region if not blank is compared with the machine identification number. The second memory is read and the second option code installed into the master key software operation key, and the machine is operated in accordance with the first and second option codes now in the master key software operation key.

DESCRIPTION

By providing a secure EEPROM (Electrically Erasable Programmable Read Only Memory) device or other non-volatile memory (NVM) as a system operation key (SOK) to control the configurable machine option attributes, various problems associated with machine option configuration and updates may be accommodated. Examples of these options may include but are not limited to: device/machine speed; machine stand alone mode, or network connected mode, market segment configuration, scanning enabled; scan to email; scan to Internet Fax; network server Fax enabled; job based accounting; hard disk overwrite; immediate job overwrite; etc.

At initial SOK install the identity of the machine is written to the NVM, i.e. the machine serial number. This is performed during initial machine power up or reboot sequence. As part of the power on or reboot routine, the machine will check to ensure no tampering has taken place and that the machine identity and the NVM serial number location data match. Alternatively, to add or remove features or change the machine configuration, a new swapped in SOK can be installed so long as the NVM serial number location has not been previously written to with a conflicting identification number. The machine would then write the serial number to the new SOK, thereby protecting it. Each SOK can enable different options, which will allow different machines to be configured however they need to be.

In one alternative embodiment, one SOK with a predetermined address would be designated as the master key SOK and track all machine configuration information. At the first install of any subsequent SOK beyond the master key SOK, the machine will interrogate the newly installed SOK and write any incremental configuration information contained therein into the master key SOK. The new subsequent SOK is contemporaneously written with the machine serial number and may be left in place or removed from the machine as the configuration upgrade is now resident in the master key SOK. A customer can add options at a later time by receiving a SOK that would enable the desired additional feature or features, and installing it into the machine. The number of SOKs that can be installed is thereby no longer limited by the number of interface sockets provided on the machine.

While the present invention will hereinafter be described in connection with a preferred embodiment thereof, it will be understood that it is not intended to limit the invention to that embodiment. On the contrary, it is intended to cover all alternatives, modifications and equivalents as may be included within the spirit and scope of the invention as defined by the appended claims.

Figure 1:
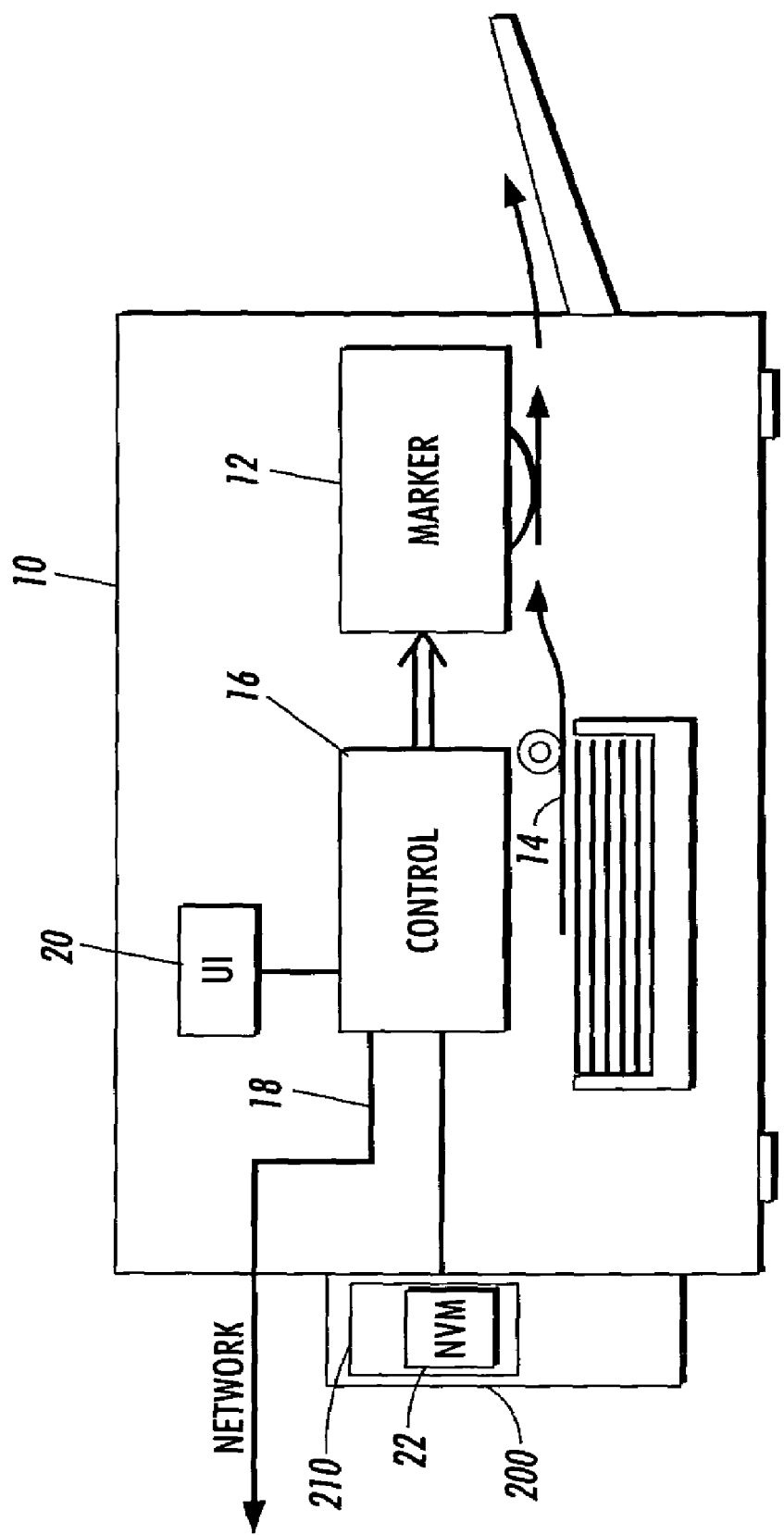
FIG. 1 is a simplified systems diagram showing essential elements of a digital printing apparatus or multi-function device relative to the present invention.

FIG. 1 is a simplified systems diagram showing essential elements of office equipment, such as a digital ink-jet or "laser" printer, relevant to the present invention. The printer 10 (which, for purposes of the claims below, could be a device such as a fax machine; digital or light-lens copier; or part of a multifunction office device) includes what is here called a marker 12, which should generally be considered the set of hardware which operates to place marks on a sheet. As such, the marker 12 could include a xerographic engine, an ink-jet printhead, thermal printer elements, etc. Print sheets drawn from a stack 14 are caused to move through or past marker 12 to receive marks thereon representing an image desired to be printed.

The basic hardware forming marker 12 is in turn controlled by software, which is embodied by a control system generally indicated as 16. As is well known in the art of office equipment, the control 16 includes any number of data-processing hardware circuits combined with suitable software for controlling the marker so as to output desired images. The control 16 can thus include a raster image processor, a facsimile capability, or even means for operating the light-lens hardware in a copier. Also as shown, control 16 can interact with a network connection 18, through which can be received not only image data but control data instructing the printer 10 to operate in a particular manner.

With particular relevance to the present invention, also associated with control 16 are a user interface UI 20, and bustle 200 with a SOK 210 comprising non-volatile memory (NVM) 22. The SOK 210 may be one of any number of memories associated with bustle 200 and control 16, but the significance of the particular SOK 210 and NVM 22 in the invention is that it should include thereon, at a predetermined location in memory that can be found by control 16, specific code data as will be described in detail below. What is important is that, in the course of the operation of machine 10, the control 16 at one point or another reads a certain amount of code data from NVM 22, and based on what is read in the NVM 22, determines in one embodiment whether to operate marker 12 at one selected speed or another speed.

Figure 2:
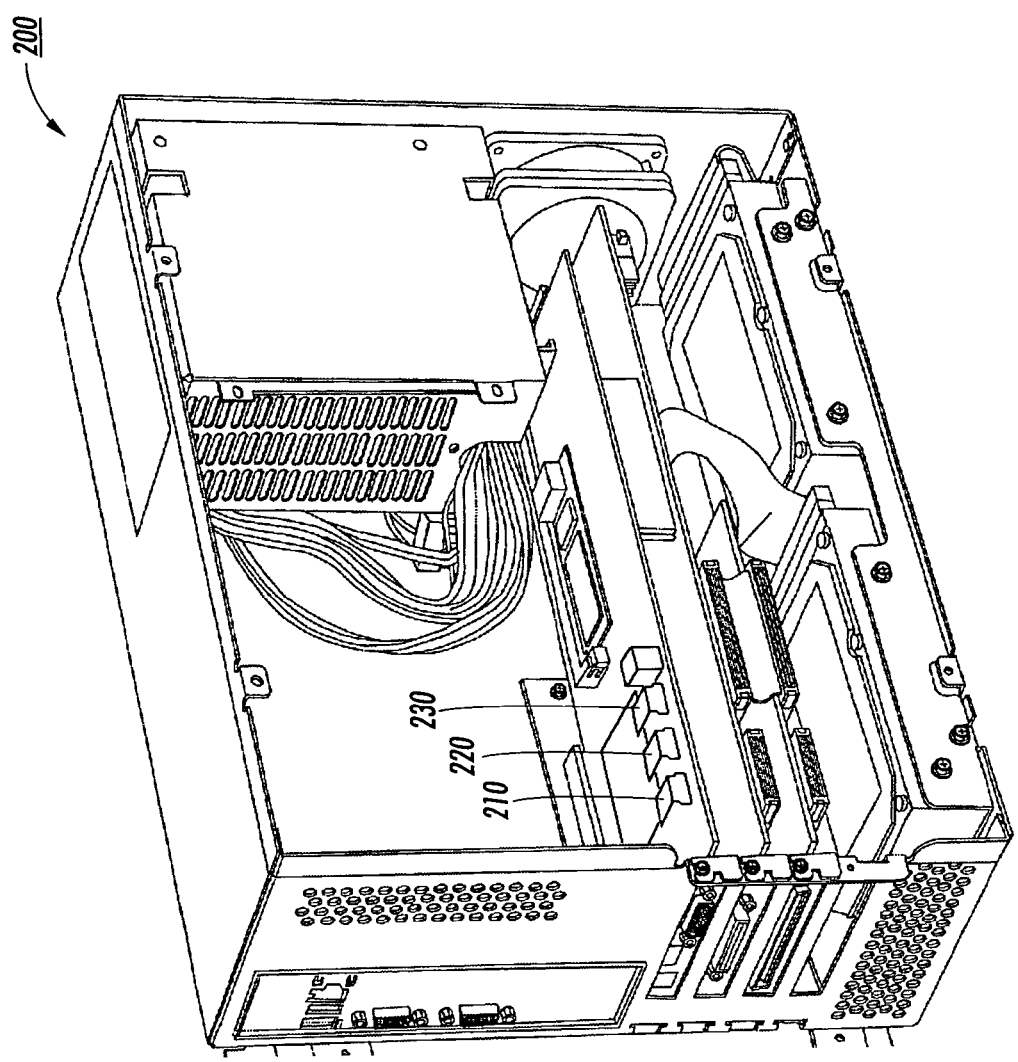
FIG. 2 further depicts the machine bustle shown in FIG. 1.

In FIG. 2 there is depicted a perspective view of the bustle 200. Located within bustle 200 is SOK 210. The bustle may also include the controller 16 as well as a power supply or any number of other circuit blocks. In one embodiment within the contemplation of this invention there is but one SOK. However, in this alternative embodiment as depicted here in FIG. 2, there is allowance for as many as three SOKs: possible SOK 210, possible SOK 220, and possible SOK 230. A multiplicity of SOKs allows for a greater number of possible options to be configured at the same time. In this embodiment, there is no requirement that any SOK be present since the machine will simply default to some base configuration in the absence of a SOK. An alternative embodiment may require at least one SOK to be present.

SOK 210 is comprised of NVM 22. A SOK may be comprised of additional elements besides memory as for example a power supply, off board drivers, socket hardware, level shifting circuits, interface hardware or circuits etc. In the present example SOK 210 is comprised solely of NVM 22. In one contemplated alternative SOK 22 is embodied as a CRUM (Customer Replaceable Unit Memory). Here NVM 22 is provided for in the form of an EEPROM (Electrically Erasable Programmable Read Only Memory). The memory 22 is preferably of a non-volatile type of memory such as the EEPROM just mentioned above. However, it will be well understood that there are many different ways to effect non-volatile memory and all those ways are within the contemplation of the present invention. For example, conventional ROM (Read Only Memory) is typically volatile and will lose the data contents of its cells when power is removed. However, if ROM is provided in combination with a long life battery on the SOK and if the ROM is of sufficiently low power dissipation, the combination may for all practical purposes effect a non-volatile memory as far as the useful life of the SOK is concerned.

Figure 3:
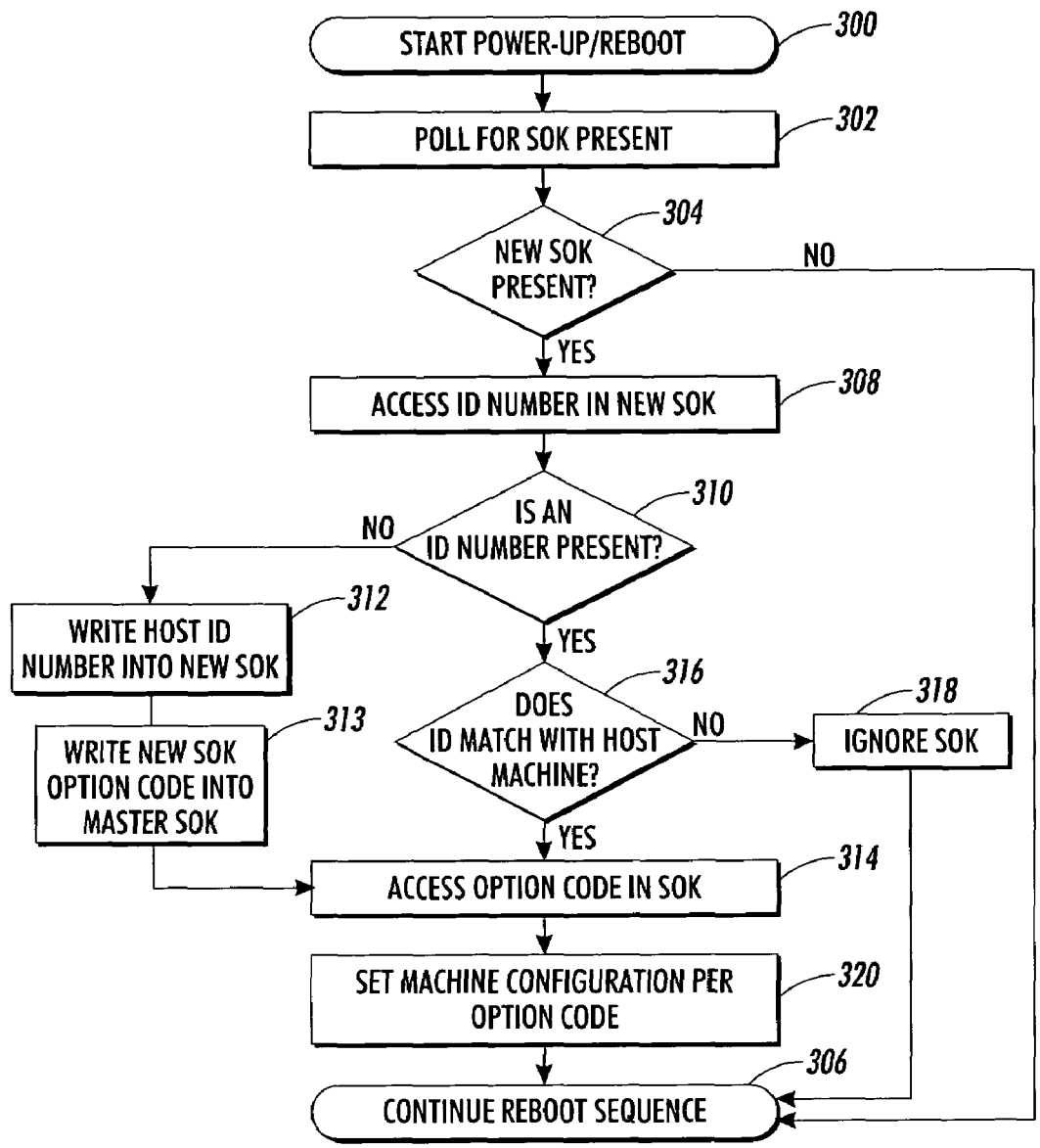
FIG. 3 is a flow chart for a methodology incorporating the software option key into the machine boot-up sequence.

In FIG. 3, shown is a flow chart for a methodology incorporating the software option key and master key variant SOK into the machine boot-up sequence. The machine in this embodiment is provided with a resident master key SOK installed into which the machine serial number has been written. After the power supply is switched on or a machine reset button is hit, the boot sequence 300 is invoked. First a poll 302 is executed to determine if there are one or more subsequently installed SOKs present. If the determination 304 is made that there are no SOK present, then the branch condition is to jump to step 306 and continue the normal reboot sequence. If however, a subsequently installed SOK is found resident access step 308 is made of that address location in the subsequent SOK containing any identification number. In a new SOK this one-time programmable serial number region is supplied initially blank.

Determination 310 is made of whether there is a identification number or not burned into the NVM of the subsequently installed SOK. If no identification number is present the conditional branch 312 is executed and the unique host machine serial number is written into the subsequently installed SOK. The option code(s) found in the subsequently installed SOK are written 313 into the master key SOK. Access 314 is then made of the option code(s) in the master key SOK. However, if an identification number is found determination 316 is made to compare the identification number to the host machine serial number. In one embodiment the presumption is made that if a match is determined then the option codes of the subsequently installed SOK are already resident in the master key SOK. For yet another embodiment not depicted here, the subsequently installed SOK option code may be confirmed and thus re-written into the master key SOK if necessary. If there is no match the 318 instruction is invoked the SOK is ignored, a fault will be logged, and the routine branched to step 306 to continue the normal reboot sequence. As will be understood by one skilled in the art, an alternative embodiment may be to flag the presence of the non-matching SOK as an error to the UI 20, or refuse to complete boot-up until the SOK is removed. In the more typically expected event of a match being found, access 314 is made of the master key SOK to find the prescribed option codes. The machine is then set 320 to a configuration as per the just read in option code. With that complete, the reboot sequence 306 may be continued.

The controller 16 may also be provided with code which continually polls for the swapping or addition of a subsequently installed SOK. In an alternative obvious to one skilled in the art, the controller 16 may respond instead to an interrupt from the swapping of a SOK. In either case upon determination of a swapped or new subsequently installed SOK the controller 16 shall poll the SOK and its NVM for indication of option updates or any new system configuration to invoke.

In closing, by employing both a master key software option key in combination with any subsequently installed software option key(s), each having a respective one time programmable serial number region initially provided as left in it's original un-programmed state (also referred to as being blank of data), there is provided a robust secure option/configuration management with a minimum of impact to the manufacturing and field service organizations.

While the embodiments disclosed herein are preferred, it will be appreciated from this teaching that various alternative modifications, variations or improvements therein may be made by those skilled in the art. For example, it will be understood by those skilled in the art that the teachings provided herein may be applicable to many types of machines and systems employing controllers and master key software option keys, including copiers, printers and multi-function scan/print/copy/fax machines or other printing apparatus alone or in combination with computer, fax, local area network and internet connection capability. All such variants are intended to be encompassed by the following claims:

The invention claimed is:

1. A method for managing printing apparatus operation options and configuration comprising:
   providing a master key software operation key separable from the printing apparatus;
   providing a subsequently installed software operation key separable from the printing apparatus, the subsequently installed software operation key further comprising a memory, with a programmable serial region and an option code;
   placing the subsequently installed software operation key into the printing apparatus;
   reading the programmable serial region of the memory and if found blank, initializing with a printing apparatus machine identification number;
   comparing the content of the programmable serial region if not blank with the printing apparatus machine identification number;
   reading the memory and installing the option code into the master key software operation key; and,
   operating the printing apparatus in accordance with the option code in the master key software operation key.

2. The method of claim 1 wherein the printing apparatus is a multi-function office device.

3. The method of claim 1 wherein the memory is a non-volatile type of memory.

4. The method of claim 1 wherein the software operation key is a CRUM.

5. The method of claim 1 wherein the machine identification number is the machine serial number.

6. A printing machine comprising:
   a master key software operations key separable from the machine;
   a subsequently installed software operations key separable from the machine, further comprising a memory, the memory having at least an option code region, and a one time programmable serial region;
   an option code written into the option code region of the memory suitable for directing the printing machine to operate in a particular configuration; and,
   a control system to access the one time programmable serial region of the memory and determine thereby if the option code in the option code region of the subsequently installed software operations key should be installed into the master key software operations key to configure the printing machine.

7. The printing machine of claim 6 wherein the memory is non-volatile memory.

8. The printing machine of claim 7 wherein the non-volatile memory is an EEPROM.

9. The printing machine of claim 7 wherein the non-volatile memory is a CRUM.

10. The printing machine of claim 6 wherein the option code directs the printing machine to configure as a scanner.

11. The printing machine of claim 10 wherein the option code directs the printing machine to configure with a scan to email mode.

12. The printing machine of claim 10 wherein the option code directs the printing machine to configure with a scan to internet fax mode.

13. The printing machine of claim 6 wherein the option code directs the printing machine to configure for faster operation.

14. The printing machine of claim 6 wherein the option code directs the printing machine to configure for job based accounting.

15. A method for managing machine operation options and configuration comprising:
   providing a master key software operation key separable from the machine the master key software operation key further comprising a first memory, with a first programmable serial region and a first option code;
   providing a subsequently installed software operation key separable from the machine, the subsequently installed software operation key further comprising a second memory, with a second programmable serial region and a second option code;
   placing the master key software operation key into the machine;
   reading the first programmable serial region of the first memory and if found blank, initializing with a machine identification number;
   comparing the content of the first programmable serial region if not blank with the machine identification number;
   placing the subsequently installed software operation key into the machine;
   reading the second programmable serial region of the second memory and if found blank, initializing with the machine identification number;
   comparing the content of the second programmable serial region if not blank with the machine identification number;
   reading the second memory and installing the second option code into the master key software operation key; and,
   operating the machine in accordance with the first option code and the second option code in the master key software operation key.

16. The method of claim 15 wherein the first memory and the second memory are an EEPROM.

17. The method of claim 16 wherein the machine identifier is the machine serial number.

18. The method of claim 15 wherein the second memory is a CRUM.

* * * * *